US010088987B2

(12) United States Patent
Izaki

(10) Patent No.: US 10,088,987 B2
(45) Date of Patent: Oct. 2, 2018

(54) MOVEMENT OF A MENU CURSOR IN A MULTI-PAGE MENU

(71) Applicant: CANON KABUSHIKI KAISHA, Tokyo (JP)

(72) Inventor: Yuko Izaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 14/399,368

(22) PCT Filed: Apr. 10, 2013

(86) PCT No.: PCT/JP2013/061342
§ 371 (c)(1),
(2) Date: Nov. 6, 2014

(87) PCT Pub. No.: WO2013/175900
PCT Pub. Date: Nov. 28, 2013

(65) Prior Publication Data
US 2015/0149945 A1    May 28, 2015

(30) Foreign Application Priority Data

May 24, 2012 (JP) ................... 2012-119070

(51) Int. Cl.
*G06F 3/0482* (2013.01)
*G06F 3/0484* (2013.01)
(Continued)

(52) U.S. Cl.
CPC ........ *G06F 3/04842* (2013.01); *G06F 3/0482* (2013.01); *G06F 3/0485* (2013.01); *H04N 5/23216* (2013.01); *H04N 5/23245* (2013.01)

(58) Field of Classification Search
CPC .. G06F 3/04842; G06F 3/0485; G06F 3/0482; H04N 5/23216; H04N 5/23245
See application file for complete search history.

(56) References Cited

U.S. PATENT DOCUMENTS 6,128,009 A * 10/2000 Ohkura .............. H04N 5/44543
348/563
9,021,371 B2 * 4/2015 Mock .................. G06Q 10/103
348/14.03
(Continued)

FOREIGN PATENT DOCUMENTS

CN      1384487 A     12/2002
CN      1936685 A     3/2007
(Continued)

OTHER PUBLICATIONS

Davomrmac: "Samsung Galaxy S (vibrant)—Video 3—Camera & HD Video Footage", XP054975179, Retrieved from the Internet: URL:http://www.youtube.com/watch?v=9SnPA_z3cP4 [retrieved on Jun. 27, 2013] Sequence 02:26, Sequence 02:34, Sequence 02:36, Sequence 00:23 (Cited in the ISO).
(Continued)

*Primary Examiner* — Justin R. Blaufeld
(74) *Attorney, Agent, or Firm* — Cowan, Liebowitz & Latman, P.C.

(57) ABSTRACT

A display control apparatus displays plural options, changes the plural options displayed on the display unit to plural other options without changing a selected option, and changes, when a first operation for changing a selected option is performed in a first state where a first option is selected and plural options including the first option are displayed, the selected option from the first option to a second option among the plural options being displayed and is adjacent to the first option, and when the first operation is performed in a second state where the first option is selected and plural options that do not include the first option are displayed, the selected option from the first option to a third option that is not adjacent to the first option and is included among the plural options being displayed.

17 Claims, 9 Drawing Sheets

(51) Int. Cl.
*G06F 3/0485* (2013.01)
*H04N 5/232* (2006.01)

(56) References Cited

U.S. PATENT DOCUMENTS

| | | | | |
|---|---|---|---|---|
| 2002/0174202 A1* | 11/2002 | Kohyama | ............ | G06F 3/0483 709/220 |
| 2003/0079227 A1* | 4/2003 | Knowles | ............ | H04N 5/44543 725/50 |
| 2005/0081164 A1* | 4/2005 | Hama | ................ | G06F 3/0482 715/830 |
| 2005/0091604 A1* | 4/2005 | Davis | ............ | G06F 3/0482 715/772 |
| 2006/0107237 A1* | 5/2006 | Kim | ................ | G06F 3/0482 715/858 |
| 2006/0184966 A1 | 8/2006 | Hunleth et al. | | |
| 2008/0125180 A1* | 5/2008 | Hoffman | ............ | G06F 3/0482 455/566 |
| 2008/0174597 A1* | 7/2008 | Takagi | ............ | G06F 3/0482 345/418 |
| 2009/0044151 A1* | 2/2009 | Ichii | ............ | G06F 3/0482 715/854 |
| 2011/0164164 A1* | 7/2011 | Aoki | ............ | G03B 13/02 348/333.01 |
| 2011/0314423 A1* | 12/2011 | Ohmiya | ............ | G06F 3/0482 715/845 |
| 2014/0033006 A1* | 1/2014 | Easter | ............ | G06F 3/0481 715/205 |

FOREIGN PATENT DOCUMENTS

| | | |
|---|---|---|
| CN | 101079953 A | 11/2007 |
| CN | 101355655 A | 1/2009 |
| JP | 2004-023415 A | 1/2004 |
| JP | 2011-076412 A | 4/2011 |

OTHER PUBLICATIONS

The US Publication and the npl references were cited the International Search Report of International Application No. PCT/JP2013/061342 dated Jul. 22, 2013, a copy of which is enclosed.

The above foreign patent documents were cited in a Nov. 28, 2016 Chinese Office Action, a copy of which is enclosed with an English Translation, that issued in Chinese Patent Application No. 201380027037.7.

The above foreign patent document was cited in a Jul. 24, 2017 Chinese Office Action, a copy of which is enclosed with an English Translation, that issued in Chinese Patent Application No. 201380027037.7.

* cited by examiner

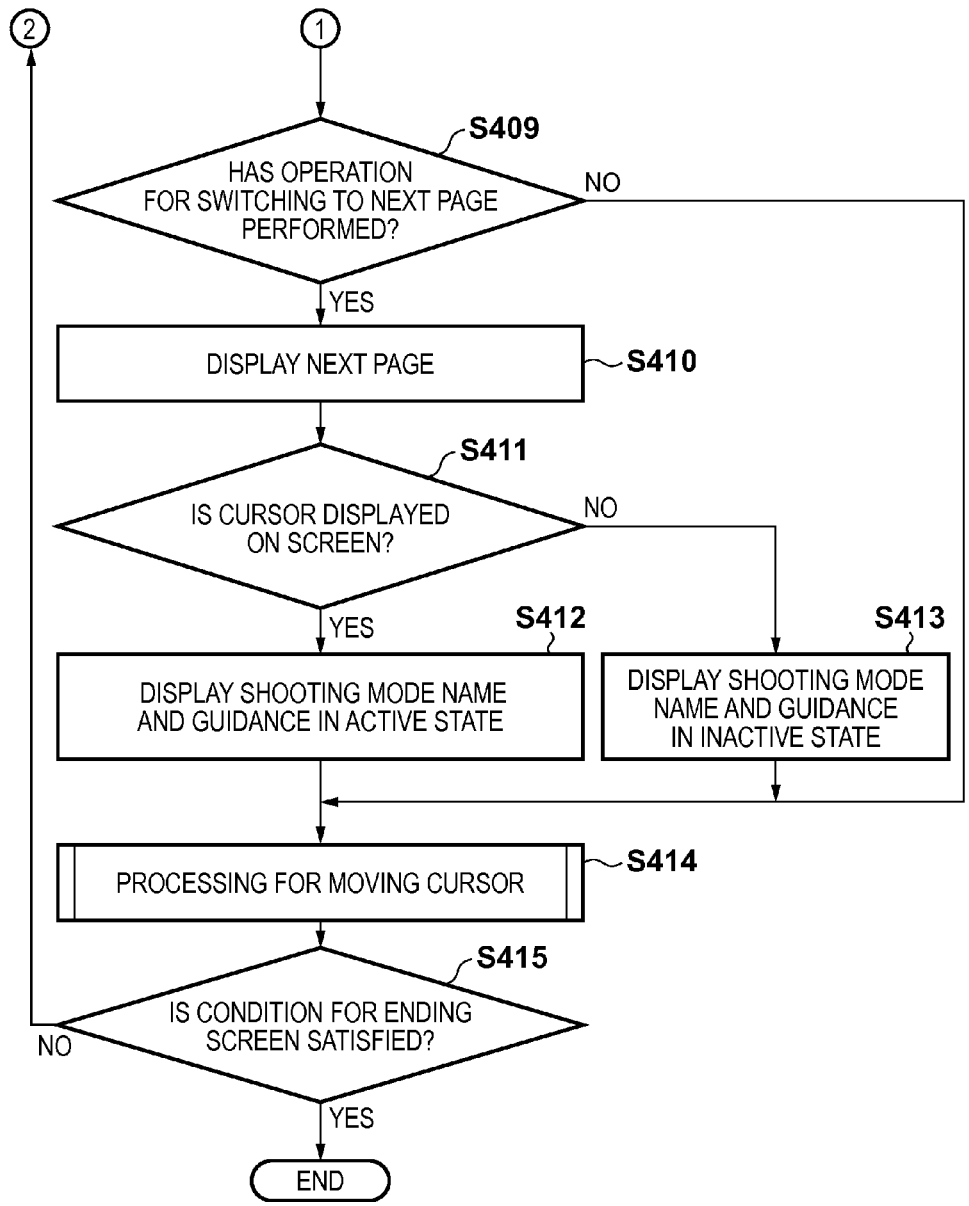

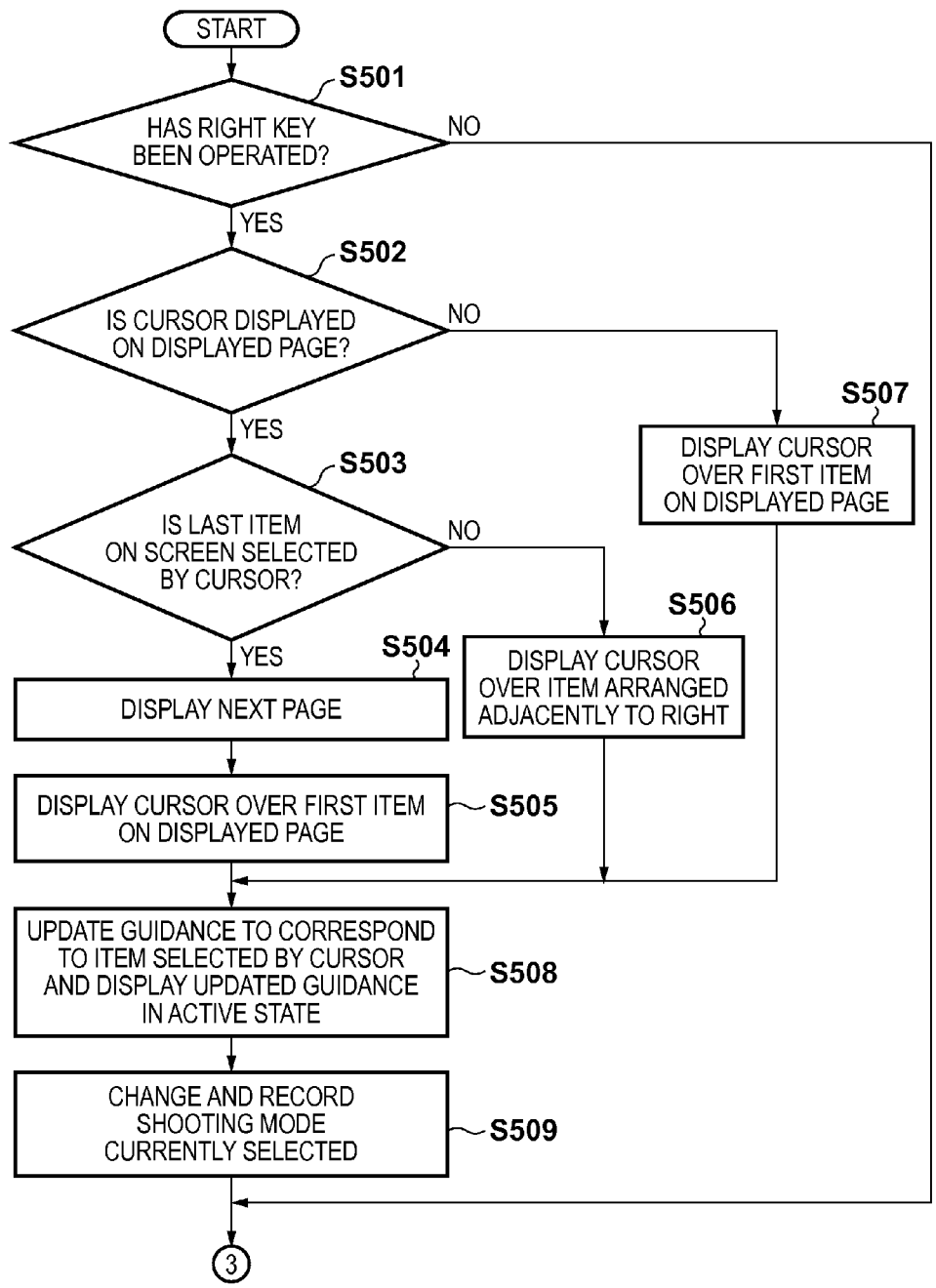

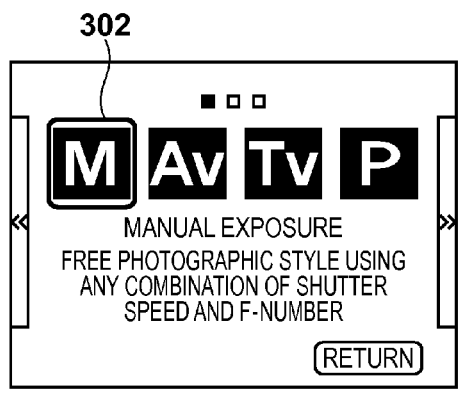
F I G. 6A
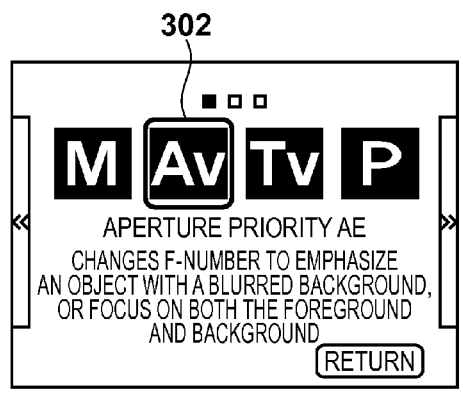
F I G. 6B
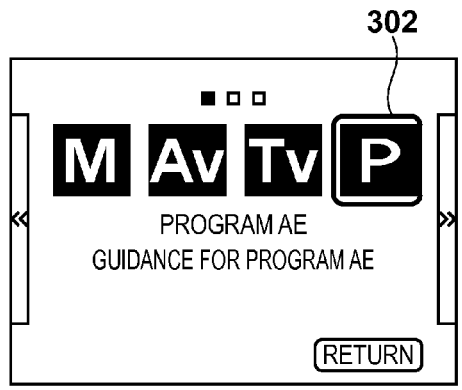
F I G. 6C
F I G. 6D

MOVEMENT OF A MENU CURSOR IN A MULTI-PAGE MENU

CROSS-REFERENCE TO RELATED APPLICATIONS

This application is a national phase application of International Application No. PCT/JP2013/061342 filed on Apr. 10, 2013 and claims priority to Japanese Application No. 2012-119070 filed May 24, 2012, the entire disclosures of which are hereby incorporated by reference.

TECHNICAL FIELD

The present invention relates to a display control technique that allows selecting any of a plurality of options being displayed.

BACKGROUND ART

There are user interfaces that display option items across a plurality of pages. In some cases, such user interfaces do not move a cursor to a screen displayed after turning a page. In these cases, a conventional way of moving the cursor requires a large number of operations to reach a desired option item, thus degrading usability.

In view of this, Japanese Patent Laid-Open No. 2011-076412 describes a technique whereby, when a character to be searched for appears on a screen of an electronic dictionary and the like as a result of scrolling the screen, a cursor is moved to the bottom (last) row on the screen if the screen was scrolled in a forward direction immediately before the appearance, and to the top (first) row on the screen if the screen was scrolled in a reverse direction immediately before the appearance.

On the other hand, Japanese Patent Laid-Open No. 2004-23415 describes a technique to move a cursor quickly to an item that a user wants to select by, while menu settings are displayed, switching among tabs using left and right keys to switch among lists of settings, and then operating the cursor using up and down keys.

However, with the above conventional techniques, an undesired item is selected if the cursor is moved at the same time as page turning, and the cursor cannot be moved quickly to an item that the user wants to select if the cursor is moved by one step per key operation (pressing of a key). Therefore, the above conventional techniques do not allow the user to quickly shift to a shooting state that the user desires, thus degrading usability.

SUMMARY OF INVENTION

The present invention has been made in consideration of the aforementioned problems, and realizes a display control technique that allows quickly selecting a desired item without impairing usability related to cursor movement through a page turning operation.

In order to solve the aforementioned problems, the present invention provides a display control apparatus comprising: display control means for controlling a display unit to display a plurality of options; changing means for changing the plurality of options displayed on the display unit to a plurality of other options without changing a selected option included among the plurality of options; and control means for performing control to change, when a first operation for changing a selected option is performed in a first state where a first option is selected and a plurality of options including the first option are displayed, the selected option from the first option to a second option that is included among the plurality of options being displayed and is adjacent to the first option, and when the first operation is performed in a second state where the first option is selected and a plurality of options that do not include the first option are displayed, the selected option from the first option to a third option that is not adjacent to the first option and is included among the plurality of options being displayed.

In order to solve the aforementioned problems, the present invention provides a display control method of an apparatus which controls a display unit to display a plurality of options, comprising: a changing step of changing the plurality of options displayed on the display unit to a plurality of other options without changing a selected option included among the plurality of options; and a control step of performing control to change, when a first operation for changing a selected option is performed in a first state where a first option is selected and a plurality of options including the first option are displayed, the selected option from the first option to a second option that is included among the plurality of options being displayed and is adjacent to the first option, and when the first operation is performed in a second state where the first option is selected and a plurality of options that do not include the first option are displayed, the selected option from the first option to a third option that is not adjacent to the first option and is included among the plurality of options being displayed.

In order to solve the aforementioned problems, the present invention provides a display control apparatus comprising: display control means for controlling a display unit to display a plurality of options; changing means for changing the plurality of options displayed on the display unit to a plurality of other options without changing a selected option included among the plurality of options; and control means for performing control to display, in a first state where a first option is selected and a plurality of options including the first option are displayed, information related to the first option on the display unit as information related to the selected option using a first display form, and in a second state where the first option is selected and a plurality of options that do not include the first option are displayed, the information related to the first option on the display unit as the information related to the selected option using a second display form different from the first display form used in the first state.

In order to solve the aforementioned problems, the present invention provides a display control method comprising: a display control step of controlling a display unit to display a plurality of options; a changing step of changing the plurality of options displayed on the display unit to a plurality of other options without changing a selected option included among the plurality of options; a first display step of performing control to display, in a first state where a first option is selected and a plurality of options including the first option are displayed, information related to the first option on the display unit as information related to the selected option using a first display form; and a second display step of performing control to display, in a second state where the first option is selected and a plurality of options that do not include the first option are displayed, the information related to the first option on the display unit as the information related to the selected option using a second display form different from the first display form used in the first state.

According to the present invention, display control is possible whereby a desired item can be quickly selected without impairing usability related to cursor movement through a page turning operation.

Further features of the present invention will become apparent from the following description of exemplary embodiments (with reference to the attached drawings).

BRIEF DESCRIPTION OF DRAWINGS

FIGS. 4A and 4B are flowcharts of display control processing for turning a page and moving a cursor.

FIGS. 5A and 5B are flowcharts of processing for moving a cursor.

FIGS. 6A to 6G show examples of display performed by display control processing according to the present embodiment.

DESCRIPTION OF EMBODIMENTS

An embodiment will now be described in which a display control apparatus according to the present invention is realized by a single-lens reflex camera with interchangeable lenses (hereinafter referred to as a camera).

<Apparatus Configuration>

A configuration and functionality of the image capturing apparatus of the embodiments of the present invention will now be described with reference to FIGS. 1A, 1B, and 2.

Figure 1A:
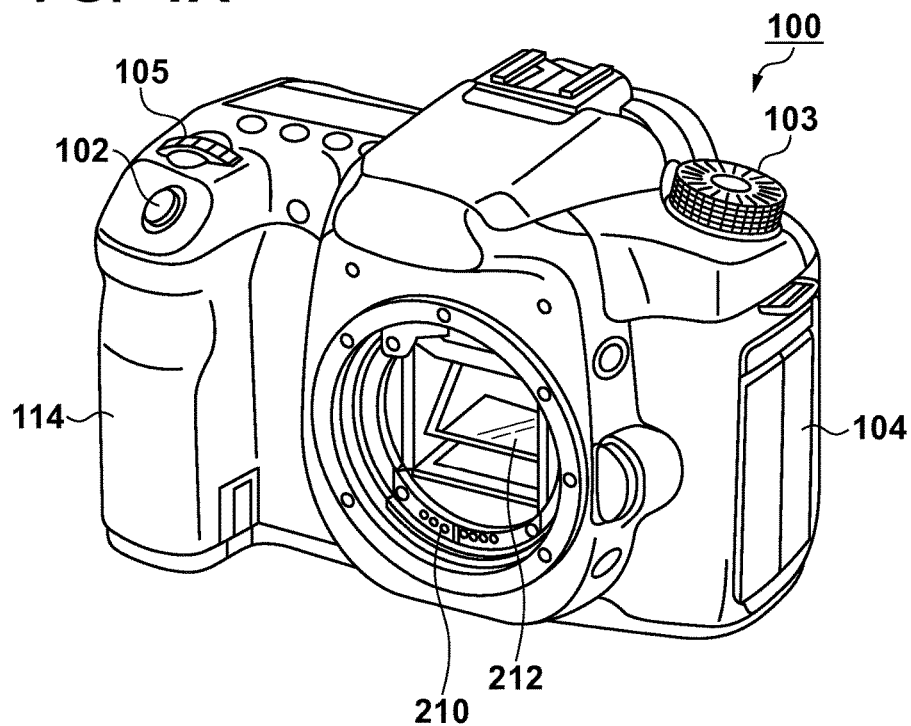
FIG. 1A shows an external view illustrating a front side of an image capturing apparatus according to an embodiment of the present invention.
Figure 1B:
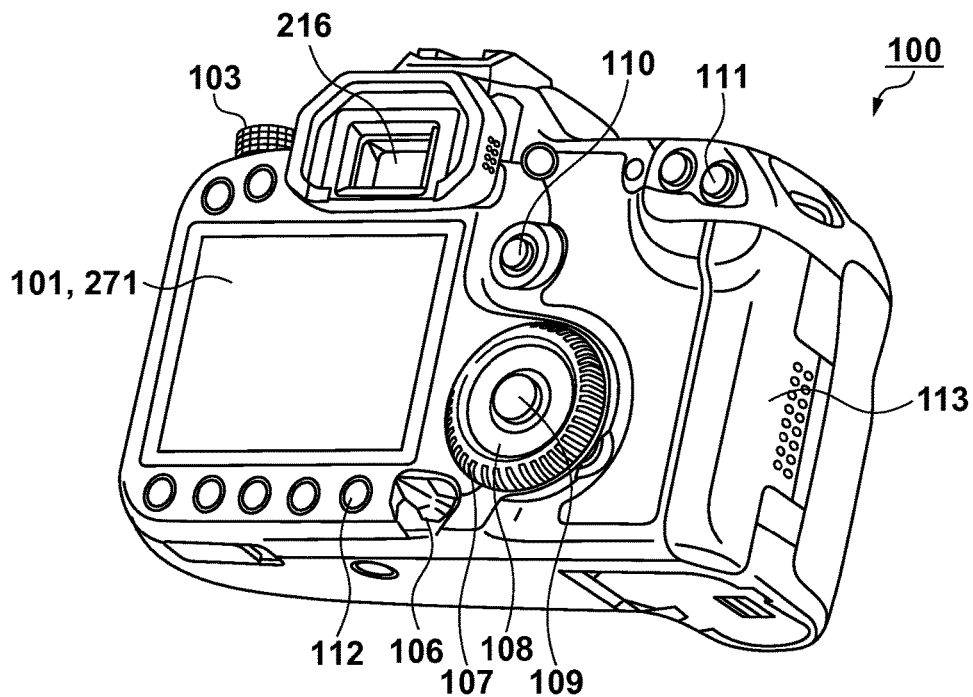
FIG. 1B shows an external view illustrating a rear side of the image capturing apparatus according to the embodiment of the present invention.

In FIGS. 1A and 1B, a display unit 101 is a display device such as an LCD for displaying images and various types of information. A shutter button 102 is an operation unit for instructing shooting. A mode switching button 103 is a dial operation unit for switching between various modes. A terminal cover 104 is a cover member that protects a connector (not shown) for connecting an external device to a camera 100 via a cable such as a USB. A main electronic dial 105 is a rotational operation member that is included among operation units 270, which will be described later with reference to FIG. 2. By rotating this main electronic dial 105, it is possible to change setting values such as shutter speed, a diaphragm, and the like. A power switch 106 is an operation member for turning the camera 100 ON or OFF. A sub-electronic dial 107 is also a rotational operation member that is included among the operation units 270, which will be described later with reference to FIG. 2, and can be used for shifting a selection border, and switching displayed images, for example. An arrow key 108 is a movable instructing member that is also included in the operation units 270, which will be described later with reference to FIG. 2, and pressing any of its upper, lower, left, and right portions makes it possible to perform an operation that corresponds to the pressed portion. A SET button 109, which is a push button also included among the operation units 270, which will be described later with reference to FIG. 2, is mainly used for selection of option items. A live view button 110, which is also a push button included among the operation units 270, which will be described later with reference to FIG. 2, is used for switching a live view ON or OFF (hereinafter referred to as LV) display in a still image shooting mode and for instructing the start and the end of the moving image shooting (recording) in a moving image shooting mode. A zooming button 111, which is also a push button included among the operation units 270, which will be described later with reference to FIG. 2, is an operation member configured to switch a zooming mode ON or OFF in the live view display and to change the zooming ratio in the zooming mode. The zooming button 111 functions as a zooming button for zooming a reproduced image in a reproduction mode and increasing the zooming ratio. A reproduction button 112, which is also a push button included among the operation units 270, which will be described later with reference to FIG. 2, is an operation member for switching between a shooting mode and a reproduction mode. By pushing the reproduction button 112 in the shooting mode, it is possible to transit to the reproduction mode and to display, on the display unit 101, the latest of the images recorded on a recording medium 250 of FIG. 2.

Figure 2:
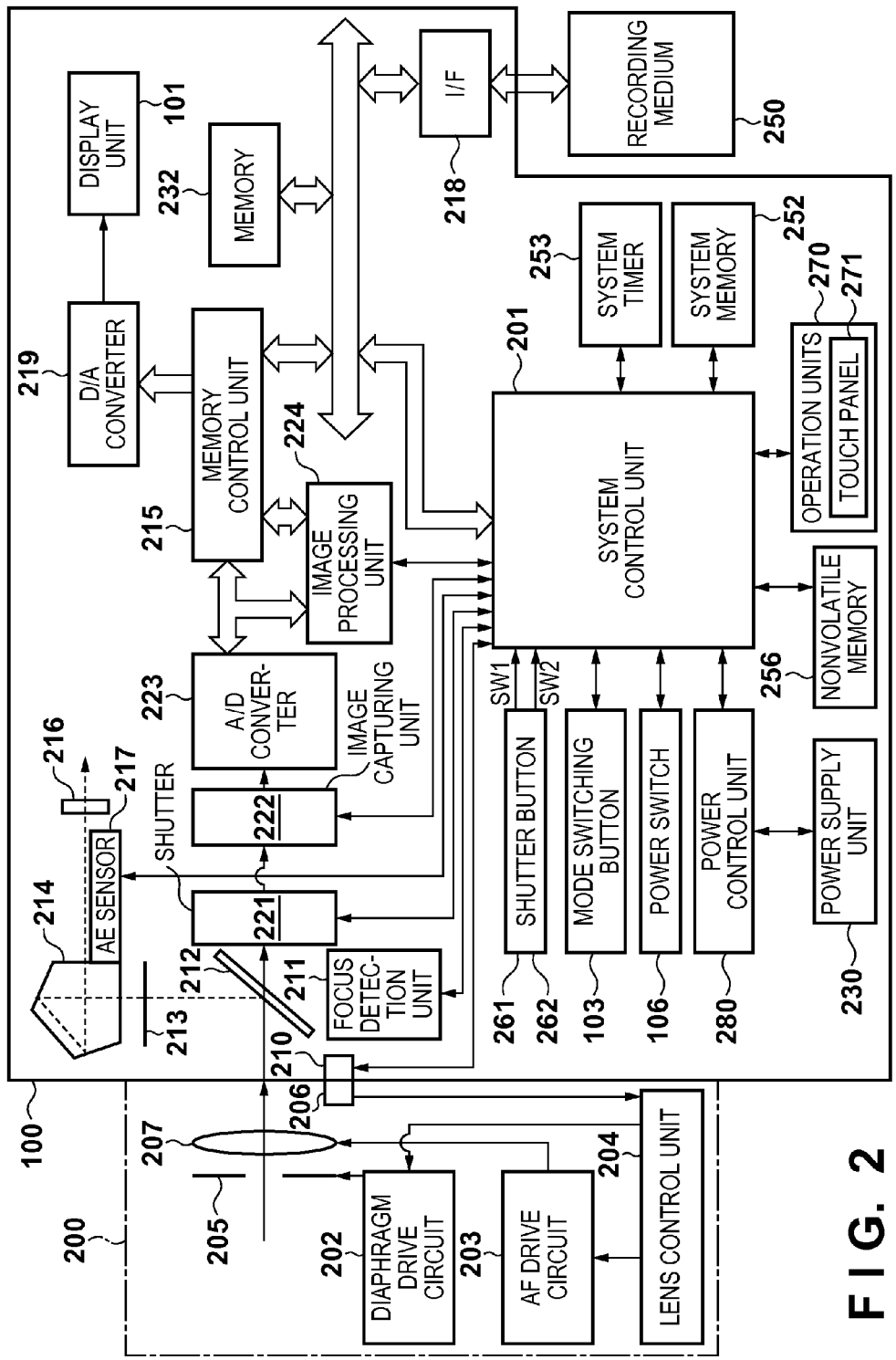
FIG. 2 is block a diagram illustrating a configuration of the image capturing apparatus of the present embodiment.

In response to an instruction of a system control unit 201 shown in FIG. 2, a quick return mirror 212 is driven to an up position (exposure position) or a down position (live view position) by an actuator (not shown). A communication terminal 210 is an electrical contact through which the camera 100 communicates with a lens unit 200 (FIG. 2). A viewfinder 216 is an optical member through which a user looks and observes a focusing screen 213 (FIG. 2) to confirm the focal point and the composition of an optical image of an object that was captured via the lens unit 200. A cover 113 is a member that opens and closes a slot so that the recording medium 250 can be inserted into and removed from the camera 100. A grip portion 114 has a shape that makes it easy for a user to grip the camera 100 with the right hand.

FIG. 2 illustrates an internal configuration of the camera 100 of the present embodiment.

In FIG. 2, the lens unit 200 provided with a shooting lens 207 can be attached to and removed from the camera 100. Although the shooting lens 207 is ordinarily constituted by a plurality of lenses, only one lens is illustrated for the sake of simplicity. A communication terminal 206 is an electrical contact through which the lens unit 200 communicates with the camera 100. The communication terminal 210 is an electrical contact through which the camera 100 communicates with lens unit 200. The lens unit 200 communicates with the system control unit 201 via the communication terminal 206. A lens control unit 204, which is included in the lens unit 200, controls a diaphragm drive circuit 202 so as to drive a diaphragm 205, as well as an AF drive circuit 203 so as to displace the position of the lens 207, thereby adjusting the focus of the lens unit 200.

An AE sensor 217 measures the luminance of an object that was captured through the lens unit 200. A focus detection unit 211 outputs a defocus amount to the system control unit 201, and the system control unit 201 communicates with the lens unit 200 depending on the defocus amount, so as to perform AF control by phase difference detection.

When exposing, displaying a live view, and shooting a moving image, the quick return mirror (hereinafter referred to as "mirror") 212 is driven, in response to an instruction from the system control unit 201, to an up position or a down position by an actuator (not shown). The mirror 212 switches a light bundle that was incident from the lens 207, to a viewfinder 216 or an image capturing unit 222. The mirror 212 is ordinarily urged to the down position so as to reflect the light bundle and guide the light bundle to a viewfinder 216, however, when exposing and displaying a live view, the mirror 212 is flipped upwards and retreats from the light bundle so as to guide the light bundle to the image capturing unit 222 (the up position). Further, the central part of the mirror 212 is half-mirrored so that part of the light bundle is transmitted and incident on the focus detection unit 211. By observing the focusing screen 213 via a pentaprism 214 and the viewfinder 216, a photographer can confirm the focal point and the composition of an optical image of an object that was captured through the lens unit 200.

A shutter 221 is a focal plane shutter that can freely control, in accordance with an instruction of the system control unit 201, the exposure time in the image capturing unit 222. The image capturing unit 222 is an image sensor that is constituted by an image sensor such as a CCD and a CMOS that converts an optical image of an object into an electrical signal. An A/D converter 223 converts an analog signal that is output from the image capturing unit 222 into a digital signal, generating image data.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

The data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the display unit 101. The memory 232 has a storage capacity that is sufficient for storing a predetermined number of still images as well as moving images and audio for a predetermined time period. The memory 232 also functions as a memory for image display (video memory). A D/A converter 219 converts the image display data stored in the memory 232 into an analog signal and applies the display unit 101 with the analog signal. The image display data that was written into the memory 232 is displayed by the display unit 101 via the D/A converter 219. The display unit 101 performs, on a display device such as an LCD, display in accordance with the analog signal from the D/A converter 219. In this manner, the digital signals stored in the memory 232 are converted into analog signals, and the analog signals are successively transmitted to the display unit 101 so as to be displayed thereon, making it possible to realize an electronic view finder (EVF) functionality and to perform through image display (live view display).

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various types of flowcharts that will be described later.

The system control unit 201 is a calculation processing device for overall controlling the entire camera 100, and realizes, by executing the programs stored in the nonvolatile memory 256, the procedures of the flowcharts that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the display unit 101, and the like, so as to perform display control. A system timer 253 is a timer circuit for measuring time periods for various types of controls and the time of an integrated clock.

A mode switching button 103, a first shutter switch 261, a second shutter switch 262, and the operation units 270 are operation members for inputting various types of instructions into the system control unit 201.

The mode switching button 103 switches the operation mode of the system control unit 201 to any of a still image recording mode, a moving image recording mode, and a reproduction mode. The still image recording mode includes an automatic shooting mode, an automatic scene determination mode, a manual mode, an aperture priority mode (Av mode), a shutter speed priority mode (Tv mode), various types of scene modes in which different settings are configured for individual shooting scenes, a program AE mode, a custom mode, and the like.

Using the mode switching button 103, the mode is directly switched to any of the plurality of modes included in the still image recording mode. Alternatively, it is also possible to switch, using the mode switching button 103, to the still image recording mode and then to switch, using another operation member, to any of the plurality of modes included in the still image shooting mode. Similarly, also the moving image shooting mode may include a plurality of modes.

While the shutter button 102 provided on the camera 100 is being operated, that is, pressed half-way (the shooting preparation instruction), the first shutter switch 261 is turned on and generates a first shutter switch signal SW1. Upon receiving the first shutter switch signal SW1, the system control unit 201 causes the image processing unit 224 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting various functional icons displayed on the display unit 101, appropriate functions for each situation are assigned to the operation units 270, and the operation units 270 thus act as various function buttons (soft button). Examples of these function buttons include an end button, a back button, an image scrolling button, a jump button, a narrow-down button, an attribute change button. For example, a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The operation units 270 are input units that receive an operation of the user and notify the system control unit 201 thereof, and include at least the following operation members: The shutter button 102, the main electronic dial 105, the power switch 106, the sub electronic dial 107, the arrow key 108, the SET button 109, the LV button 110, the zooming button 111, and the reproduction button 112.

A power control unit 280 is constituted by, for example, a battery detection circuit, a DC-DC converter, a switch circuit for changing over the block to be supplied with power, and detects a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as an NiCd battery, an NiMH battery, or an Li battery, or an AC adaptor. The recording medium interface (I/F) 218 is for interfacing with the recording medium 250 such as the memory card or hard disk. The recording medium 250 is a recording medium such as a memory card for recording shot images, and constituted by a semiconductor memory, a magnetic disk, or the like.

Included among the operation units 270 is also a touch panel 271 as a touch detecting unit capable of detecting a touch operation on the display unit 101. The touch panel 271 and the display unit 101 can be constructed as a single integrated unit. For example, the touch panel 271 is constructed in such a manner that the transmittance of light will not interfere with the display presented by the display unit 101, and it is attached to the uppermost layer of the display face of the display unit 101. In addition, input coordinates on the touch panel 271 and display coordinates on the display unit 101 are correlated. As a result, a GUI can be constructed that makes it possible for the user to directly manipulate the screen displayed on the display unit 101. The system control unit 201 is capable of detecting the following operations performed by contacting the touch panel 271: touching of the panel 271 using a finger or pen (referred to as "touch-down" below); a state in which the touch panel 271 is in contact with a finger or pen (referred to as "touch-on" below); movement of a finger or pen while in contact with the touch panel 271 (referred to as "move" below); lifting of a finger or pen that has been in contact with the touch panel 271 (referred to as "touch-up" below); and a state in which the touch panel 271 is not being touched at all (referred to as "touch-off" below). These operations and position coordinates at which the touch panel 271 is being touched by the finger or pen are communicated to the system control unit 201 through an internal bus and, based upon the information thus communicated, the system control unit 201 determines what kind of operation was performed on the touch panel 271. As for "move", the determination can be made also for every vertical component and horizontal component with regard to the direction of movement of the finger or pen, which is moved on the touch panel 271, based upon a change in the coordinate position. Further, it is assumed that a stroke has been made when "touch-up" is performed following a regular "move" after a "touch-down" on the touch panel 271. A very quick stroke action is referred to as a "flick". A "flick" is an operation in which, with fingers in contact with the touch panel 271, the fingers are moved rapidly over a certain distance and then lifted. In other words, this is a rapid tracing operation in which the fingers are flicked across the surface of the touch panel 271. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. It should be noted that the touch panel 271 may employ a method that relies upon any of the following: resistive film, electrostatic capacitance, surface acoustic waves, infrared radiation, electromagnetic induction, image recognition and optical sensing.

<Screen Configuration>

Figure 3:
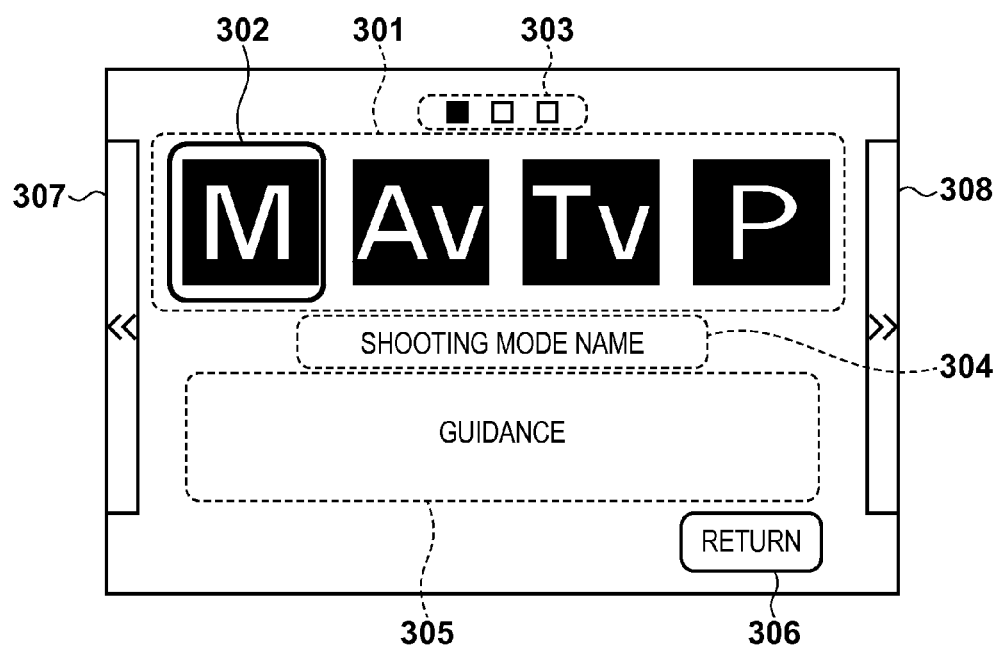
FIG. 3 shows an example of a configuration of a displayed screen.

The following is a description of a configuration of a shooting mode selection screen with reference to FIG. 3.

When an instruction to display a shooting mode selection screen is issued by a user operation, the system control unit 201 displays the screen shown in FIG. 3 on the display unit 101.

Referring to FIG. 3, an item display area 301 is an area for displaying a plurality of items representing a plurality of shooting modes that can be set to the camera 100 as options. For example, one of the plurality of items over which a cursor 302 is displayed is an icon representing a manual exposure mode that is selectable as a shooting mode to be set.

The cursor 302 is displayed over an item representing a shooting mode that is currently set. More specifically, the cursor 302 is a selection frame indicating that this shooting mode is currently set (selected). Upon acceptance of an operational instruction from the operation unit 270, the system control unit 201 can move the cursor 302 to any option (item representing a shooting mode) and change to the settings of that shooting mode. An item over which the cursor 302 is displayed is hereinafter referred to as a selected item.

Page indexes 303 are indexes showing the position of a page currently displayed. When option items are arranged across a plurality of pages, the system control unit 201 reads, from the nonvolatile memory 256, information showing the number of the page currently displayed out of the total number of pages, and displays the read information. Although the page numbers are displayed using blocks in FIG. 3, the page numbers may instead be displayed using numerical values.

A shooting mode name 304 is an area for displaying the name of the shooting mode represented by the selected item. Guidance 305 is an area for displaying a description of the shooting mode represented by the selected item. The system control unit 201 places the shooting mode name 304 and the guidance 305 in an active state (e.g. displays the text in white) when the item being selected by the cursor 302 is displayed on the screen, and in an inactive state (e.g. grays out the text) when the item being selected by the cursor 302 is not displayed on the screen. Note that the guidance 305 may not be displayed.

Each time the right key (right part) or the left key (left part) of the arrow keys 108 included in the operation units 270 is pressed, the cursor 302 is moved to an item that is adjacent in the direction of the pressed key. Alternatively, the cursor 302 may be moved directly in accordance with a touch-down operation applied to the display area displaying the items.

A page turning area 308 is a touch-operable area for accepting an operational instruction to turn to a next page. When the user applies a touch-up operation to the page turning area 308, the user can turn to a next page. A page returning area 307 is a touch-operable area for accepting an operational instruction to return to a previous page. When the user applies a touch-up operation to the page returning area 307, the user can return to a previous page. The user can directly turn to any page by applying a touch operation and a touch-up operation successively in this order to an index showing a page other than the page currently displayed out of the page indexes 303 (on a white square mark in the example of FIG. 3). If page turning or page returning (hereinafter, "page switching") is performed, then a set of items representing shooting modes that is different from the currently displayed set of items representing shooting modes will be displayed. Immediately after the page switching, the settings of the shooting mode represented by the item over which the cursor 302 was displayed prior to the page switching remain as the current settings, and therefore the cursor 302 is not displayed. In the state where the cursor 302 is not displayed, the shooting mode name 304 and the guidance 305 that were displayed for the shooting mode represented by the item over which the cursor 302 was displayed prior to the page switching are maintained as-is. That is to say, the shooting mode name 304 and the guidance 305 are related to the shooting mode that is currently set, irrespective of the page (items) currently displayed. It should be noted, however, that when the cursor 302 is not displayed, the shooting mode name 304 and the guidance 305 are grayed out when displayed (displayed in the inactive state), so as to indicate that the shooting mode name 304 and the guidance 305 are not related to the items currently displayed. When the system control unit 201 accepts an operation for moving the cursor 302 (the left and right keys or a touch-down operation on an item) in the state where the cursor 302 is not displayed immediately after the page switching, the system control unit 201 displays the cursor 302 over an item included in the page currently displayed. The system control unit 201 also changes the settings of the shooting mode and changes the shooting mode name 304 and the guidance 305 to show the item over which the cursor 302 is displayed.

A return button 306 is a touch-operable icon for accepting an operational instruction to end the shooting mode selection screen. When a touch-up operation is applied to this area, the shooting mode selection screen is ended, thus switching to another screen (e.g. the state of display prior to the shooting mode selection screen).

<Screen Display Processing>

The following is a description of processing for turning a page and moving a cursor on the shooting mode selection screen shown in FIG. 3 with reference to FIGS. 4A to 6G. These processes are realized by the system control unit 201 executing programs recorded in the nonvolatile memory 256 after expanding the programs to the system memory 252.

Figure 4A:
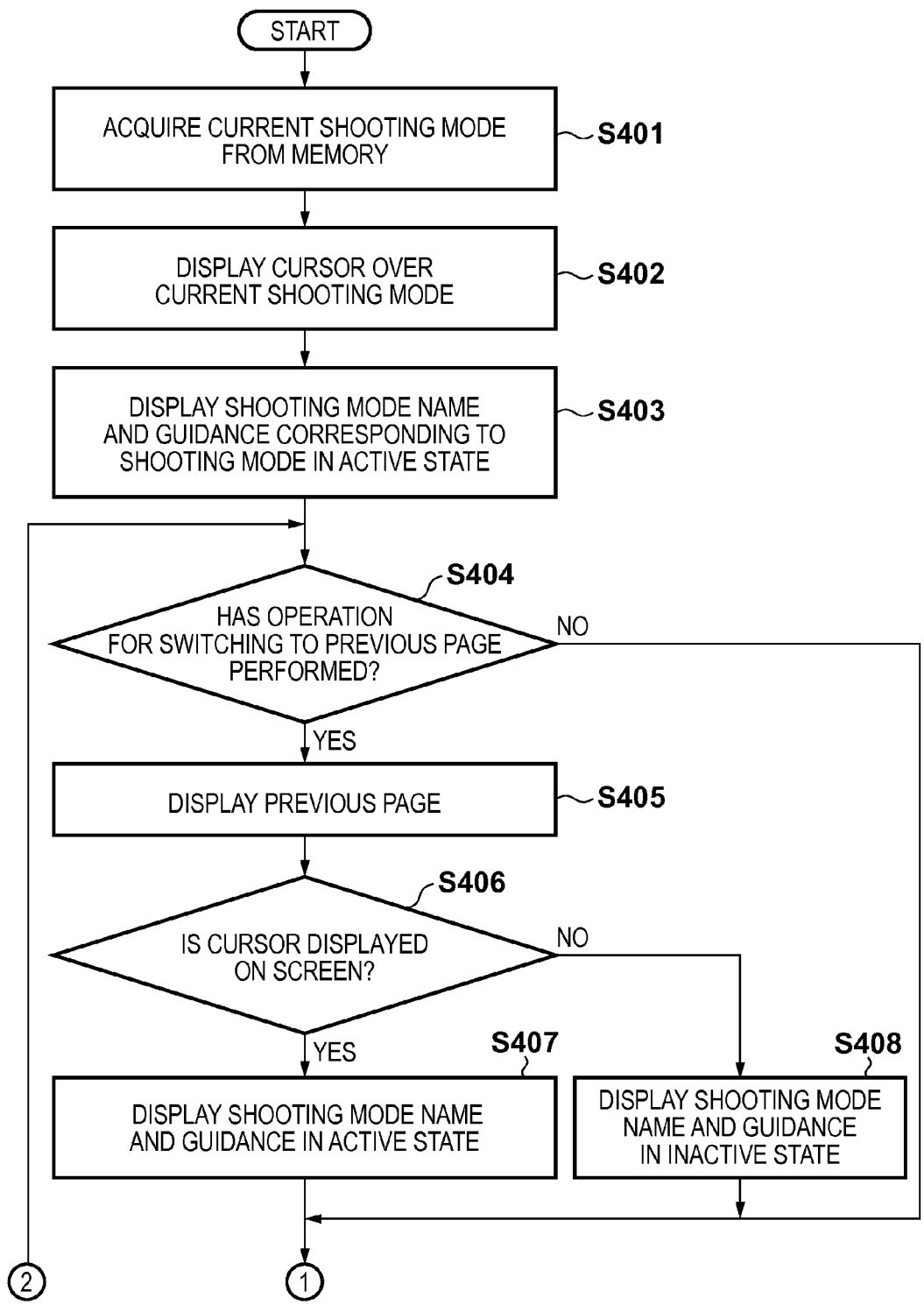

When an instruction to display the shooting mode selection screen is issued by a user operation, the system control unit 201 starts processing shown in FIGS. 4A and 4B. Referring to FIG. 4A, in S401, the system control unit 201 reads a current shooting mode from the nonvolatile memory 256.

In S402, the system control unit 201 displays items representing a plurality of shooting modes that should be displayed on a page including an item representing the current shooting mode, and displays the cursor 302 over the item representing the current shooting mode. The system control unit 201 also displays the page indexes 303 showing the position of the page currently displayed.

In S403, the system control unit 201 displays the name of the current shooting mode in the display area of the shooting mode name 304, and a description of the current shooting mode in the display area of the guidance 305, both in the active state. As a result, provided that the current shooting mode is manual exposure, the screen of FIG. 6A is displayed on the display unit 101.

In S404, the system control unit 201 determines whether or not there has been an operational instruction to turn to a page previous to the page currently displayed. Here, the system control unit 201 determines that there has been an operation for switching to a page previous to the page currently displayed when the system control unit 201 detects a touch-up operation on the page returning area 307 or on a mark showing the previous page out of the page indexes 303. The system control unit 201 proceeds to S405 when determining that there has been an operational instruction to switch to a page previous to the page currently displayed, and proceeds to S409 when determining that there has been no such operational instruction.

In S405, the system control unit 201 displays a page previous to the page currently displayed. When detecting a touch-up operation on the page returning area 307 in S404, the system control unit 201 displays a page immediately previous to the page currently displayed. On the other hand, when detecting a touch-up operation on a mark showing any previous page out of the page indexes 303 in S404, the system control unit 201 displays a page corresponding to that mark. As a result, a different set of items is displayed. At this time, the cursor 302 is not moved from the page that was displayed before the page switching. More specifically, in the case where the cursor 302 was displayed on the page that was displayed before the page switching, the cursor 302 stays on the page that was displayed before the page switching and is thus not displayed on the page that is displayed after the page switching. In the case where the cursor 302 was not displayed on the page that was displayed before the page switching, if a page that previously displayed the cursor 302 is displayed back again as a result of the page switching, then the cursor 302 is displayed over an item over which the cursor 302 was previously displayed.

In S406, the system control unit 201 determines whether or not to display the cursor 302 on the page that is currently displayed after the page switching. More specifically, the system control unit 201 determines whether or not the page that is currently displayed after the page switching previously displayed the cursor 302. The system control unit 201 proceeds to S407 when determining that the current page previously displayed the cursor 302, and to S408 when determining that the current page is not a page that has previously displayed the cursor 302.

In S407, the system control unit 201 displays the shooting mode name 304 and the guidance 305 of the shooting mode in the active state. An example of this display is shown in FIG. 6A. When an operation for returning to a previous page is performed in the state where the cursor 302 is not displayed and the cursor 302 was last displayed over an item representing manual exposure (FIG. 6D), the system control unit 201 displays the cursor 302 over the item representing manual exposure in the same manner as the immediately previous page (FIG. 6A).

In S408, as the current page is not a page that has previously displayed the cursor 302, the system control unit 201 displays the shooting mode name 304 and the guidance 305 that were displayed before the page switching in the inactive state.

Referring to FIG. 4B, in S409, the system control unit 201 determines whether or not there has been an operational instruction to switch to a page next to the page currently displayed. Here, the system control unit 201 determines that there has been an operational instruction to switch to a page next to the page currently displayed when the system control unit 201 detects a touch-up operation on the page turning area 308 or on a mark showing the next page out of the page indexes 303. The system control unit 201 proceeds to S410 when determining that there has been an instruction to switch to a next page, and proceeds to S414 when determining that there has been no such instruction.

In S410, the system control unit 201 displays a page next to the page currently displayed. When detecting a touch-up operation on the page turning area 308 in S409, the system control unit 201 displays a page immediately next to the page currently displayed. On the other hand, when detecting a touch-up operation on a mark showing any later page out of the page indexes 303 in S409, the system control unit 201 displays a page corresponding to that mark. As a result, a different set of items is displayed. At this time, the cursor 302 is not moved from the page that was displayed before the page switching. More specifically, in the case where the cursor 302 was displayed on the page that was displayed before the page switching, the cursor 302 stays on the page that was displayed before the page switching and is thus not displayed on the page that is displayed after the page switching. In the case where the cursor 302 was not displayed before the page switching, if a page that previously displayed the cursor 302 is displayed back again as a result of the page switching, then the cursor 302 is displayed over an item over which the cursor 302 was previously displayed.

In S411, the system control unit 201 determines whether or not to display the cursor 302 on the page that is currently displayed after the page switching. More specifically, the system control unit 201 determines whether or not the page that is currently displayed after the page switching previously displayed the cursor 302. The system control unit 201 proceeds to S412 when determining that the current page previously displayed the cursor 302, and to S413 when determining that the current page is not a page that has previously displayed the cursor 302.

In S412, the system control unit 201 displays the shooting mode name 304 and the guidance 305 in the active state.

In S413, as the current page is not a page that has previously displayed the cursor 302, the system control unit 201 displays the shooting mode name 304 and the guidance 305 that were displayed before the page switching in the inactive state. An example of this display is shown in FIG. 6D. When an operation for turning to a next page is performed in the state where the cursor 302 is displayed over an item representing manual exposure on a current page (FIG. 6A), the screen of FIG. 6D is displayed on the display unit 101 after the page switching. The resultant page (FIG. 6D) includes a set of items different from a set of items displayed on the previous page (FIG. 6A). The cursor 302 stays on the previous page and is thus not displayed on the resultant page. Furthermore, as the shooting mode name 304 and the guidance 305 are related to an item included in the previous page, they are grayed out when displayed so as to indicate that they are not related to any of the items included in the resultant page. In the example of FIG. 6D, a shooting mode set to the camera 100 is manual exposure.

In S414, the system control unit 201 executes processing for moving a cursor, which will be described later with reference to FIGS. 5A and 5B.

In S415, the system control unit 201 determines whether or not a condition for ending the shooting mode selection screen is satisfied. Examples of the condition for ending the shooting mode selection screen include: automatic power-off, which is carried out when no operation has been performed for a predetermined time period or longer; a touch operation on the return button 306, which is an operation for exiting the shooting mode selection screen; an on state of the SW1 signal triggered by pressing the shutter button 102 halfway down (the on state of the SW1 signal leads to a shooting standby screen); an instruction to switch to the reproduction mode; and an operation for turning off the power. When the condition for ending the shooting mode selection screen is not satisfied, the system control unit 201 returns to S404 and repeats the processes. On the other hand, when the condition for ending the shooting mode selection screen is satisfied, the system control unit 201 ends the processing for the shooting mode selection screen.

<Processing for Moving Cursor>

Figure 5B:
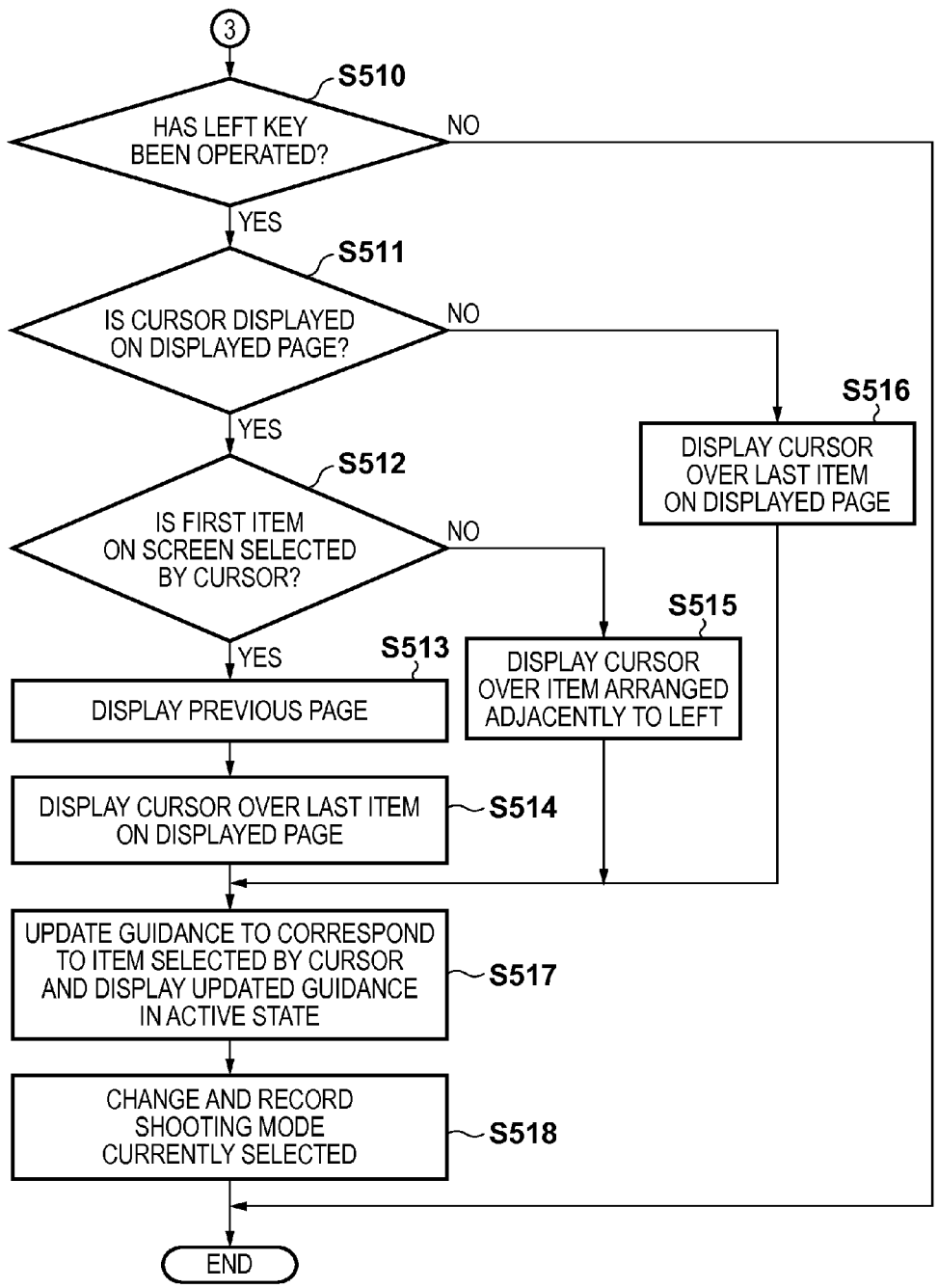

The following is a description of processing for moving a cursor, which is executed in S414 of FIG. 4B, with reference to FIGS. 5A and 5B.

Referring to FIG. 5A, in S501, the system control unit 201 determines whether or not there has been an operation of pressing the right key of the arrow keys 108. The system control unit 201 proceeds to S502 when the right key has been pressed, and to S510 when the right key has not been pressed.

In S502, the system control unit 201 determines whether or not the cursor 302 is displayed on the page currently displayed. The system control unit 201 proceeds to S503 when the cursor 302 is displayed, and to S507 when the cursor 302 is not displayed.

In S503, the system control unit 201 determines whether or not a selected item over which the cursor 302 is displayed is the last (rightmost) item out of the items displayed on the screen. This refers to, for example, the state of FIG. 6C. The system control unit 201 proceeds to S504 when the selected item is the last item, and to S506 when the selected item is not the last item.

In S504, the system control unit 201 performs page switching and displays a next page.

Figure 6E:
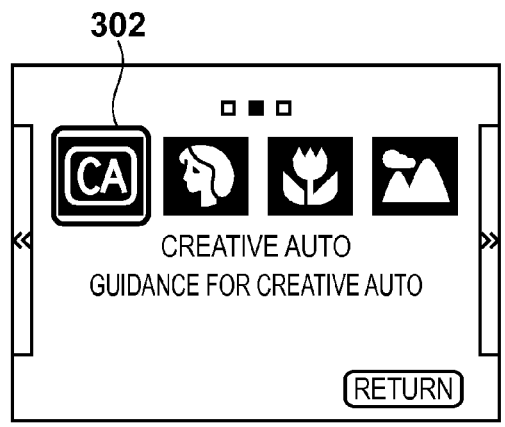

In S505, the system control unit 201 displays the cursor 302 over the first (leftmost) item out of a plurality of items displayed on the page that is displayed after the page switching. An example of this display is shown in FIG. 6E. More specifically, when the right key is pressed in the state where the rightmost item is selected on a current page (FIG. 6C), the system control unit 201 moves the cursor 302 to an item displayed on the next page (FIG. 6E), and therefore this item displayed on the next page serves as a selected item.

On the other hand, in S506, the system control unit 201 moves the cursor 302 to an item that is arranged adjacently to the right of the item over which the cursor 302 is currently displayed out of the items displayed on the current page. For example, when the right key is pressed in the state where an item representing manual exposure, which is not the rightmost item on a current page, is selected (FIG. 6A), the system control unit 201 moves the cursor 302 to an item representing aperture priority AE, which is arranged adjacently to the right of the item representing manual exposure (FIG. 6B).

In S507, the system control unit 201 displays the cursor 302 over the first (leftmost) item out of the items displayed on the page currently displayed, and therefore this item serves as a selected item. For example, when the right key is pressed in the case where the current selected item is manual exposure that is not included in the page currently displayed (FIG. 6D), the system control unit 201 changes the selected item by moving the cursor 302 to creative auto, which is the first item on the page currently displayed (FIG. 6E). In the above manner, although a selected item is not changed in response to a page switching operation, when an operation for changing a selected item is performed on a page that is currently displayed after page switching, one of the items included in the page currently displayed is selected as a new selected item by displaying the cursor 302 thereover, while skipping the items arranged between the item previously selected and the items included in the page currently displayed. For example, when the right key is pressed in the state where the cursor 302 is not displayed (FIG. 6D), the first item on the page currently displayed, which is creative auto, is selected as a new selected item by displaying the cursor 302 thereover, while skipping the following items arranged between the item previously selected, which is manual exposure, and the items included in the page currently displayed: aperture priority AE, shutter speed priority AE and program AE. Note that the purpose of moving the cursor 302 to the first (leftmost) item on the page currently displayed when the right key is pressed in the state where the cursor 302 is not displayed, is to enable an operation on the same right key to move the cursor 302 on the same page successively. In other words, when an operation for moving the cursor 302 is performed in the state where the cursor 302 is not displayed, an item that is arranged most upstream in the instructed direction of movement of the cursor 302 on the page currently displayed (the rightward direction) is selected.

In S508, the system control unit 201 updates the shooting mode name 304 and the guidance 305 to correspond to the shooting mode newly selected by the cursor 302 moved in any of S505 to S507, and displays the updated shooting mode name 304 and guidance 305 in the active state.

In S509, the system control unit 201 sets the shooting mode newly selected by the cursor 302 moved in any of S505 to S507 as a current shooting mode, and records the same in the nonvolatile memory 256. As a result, the settings are changed. That is to say, the next time the SW2 signal is input, an image is captured in accordance with the settings of the new shooting mode.

Referring to FIG. 5B, in S510, the system control unit 201 determines whether or not there has been an operation of pressing the left key of the arrow keys 108. The system control unit 201 proceeds to S511 when the left key has been pressed, and to S415 when the left key has not been pressed.

In S511, the system control unit 201 determines whether or not the cursor 302 is displayed on the page currently displayed. The system control unit 201 proceeds to S512 when the cursor 302 is displayed, and to S516 when the cursor 302 is not displayed.

In S512, the system control unit 201 determines whether or not a selected item over which the cursor 302 is displayed is the first (leftmost) item out of the items displayed on the screen. This refers to, for example, the state of FIG. 6E. The system control unit 201 proceeds to S513 when the selected item is the first item, and to S515 when the selected item is not the first item.

In S513, the system control unit 201 performs page switching and displays a previous page.

In S514, the system control unit 201 displays the cursor 302 over the last (rightmost) item out of a plurality of items displayed on the page displayed after the page switching. An example of this display is shown in FIG. 6C. More specifically, when the left key is pressed in the state where the leftmost item is selected on a page currently displayed (FIG. 6E), the cursor 302 is moved to select the rightmost item on a previous page (FIG. 6C). For example, when the left key is pressed in the state where the first item is selected on the first page (FIG. 6A), the cursor 302 is moved to the last item on the third page, which is immediately previous to the first page (FIG. 6G) (in the present example, the third page is the last page as the page switching is looped).

On the other hand, in S515, the system control unit 201 moves the cursor 302 to an item that is arranged adjacently to the left of the item over which the cursor 302 is currently displayed out of the items displayed on the current page. For example, when the left key is pressed in the state where aperture priority AE, which is not the leftmost item on the first page, is selected (FIG. 6B), the system control unit 201 moves the cursor 302 to an item representing manual exposure, which is arranged adjacently to the left of the item representing aperture priority AE (FIG. 6A).

Figure 6F:
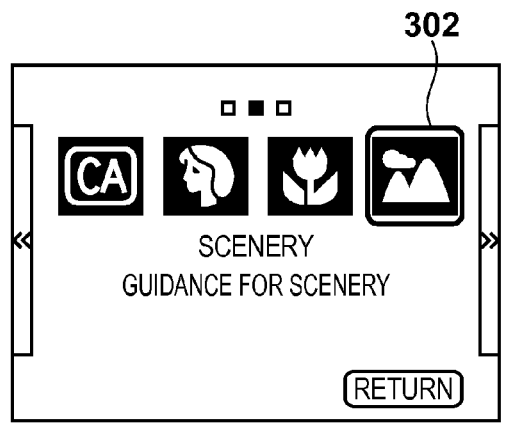
Figure 6G:
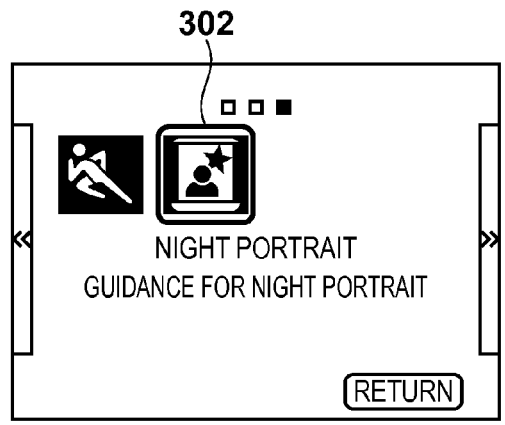

In S516, the system control unit 201 displays the cursor 302 over the last (rightmost) item out of the items displayed on the page currently displayed, and therefore this item serves as a selected item. For example, when the left key is pressed in the case where the current selected item is not included in the second page currently displayed, the system control unit 201 changes the selected item to scenery, which is the last item on the second page currently displayed, by displaying the cursor 302 over scenery (FIG. 6F).

In S517, the system control unit 201 updates the shooting mode name 304 and the guidance 305 to correspond to the shooting mode newly selected by the cursor 302 moved in any of S514 to S516, and displays the updated shooting mode name 304 and guidance 305 in the active state.

In S518, the system control unit 201 sets the shooting mode newly selected by the cursor 302 moved in any of S514 to S516 as a current shooting mode, and records the same in the nonvolatile memory 256. As a result, the settings are changed. That is to say, the next time the SW2 signal is input, an image is captured in accordance with the settings of the new shooting mode.

According to the present embodiment, when a first operation for turning a page is performed (e.g. when the right key is pressed) in the state where a first option (e.g. manual exposure) is selected from among a plurality of options currently displayed, an option that is adjacent to the first option is newly selected. On the other hand, when the first operation is performed in the state where the first option is selected and a plurality of options that do not include the first option are currently displayed, an option that is not adjacent to the first option and is included among the plurality of options currently displayed is newly selected. This makes it possible to view other options that are displayed through page switching without changing the selected option, and therefore to quickly select a desired option without impairing usability related to cursor movement through a page turning operation.

Although omitted from the above description, when a touch operation is applied to any item (option) displayed on a page, the cursor can be moved to the touched item.

When an item that cannot be selected is displayed, this item need not be treated as a selectable item. For example, when moving the cursor 302 to the right by one item, if a certain item that is arranged adjacently to the right of a current selected item cannot be selected, then the cursor 302 is moved to a selectable item that is arranged to the right of that certain item.

Although the present embodiment has provided an example in which displayed options (items) are changed by a page switching operation, the present invention is also applicable to the case where displayed options are changed by a scrolling operation. More specifically, the present invention is applicable to an apparatus that can scroll to a position where a selected item is not displayed (move between positions where items are displayed). In this case, when the selected item is no longer displayed due to a change in displayed items caused by scrolling, items displayed after scrolling are treated in a manner similar to items displayed after page switching described in the above embodiment.

Although shooting modes have been used as switchable parameters in the above description, any other switchable parameters may be used instead.

Note that the control with the system control unit 201 may be carried out with a single hardware component or with a plurality of hardware components sharing the processing load.

Although the present invention has been described in detail on the basis of its suitable embodiments, the present invention is not limited to these specific embodiments, and includes various aspects without departing from the scope of the summary of the present invention. Further, the above-described embodiments show merely examples of the present invention, and can be suitably combined.

Although the above-described embodiments has been described with examples in which the present invention is applied to an image capturing apparatus, the present invention is not limited to these examples and the present invention is applicable to any apparatus in which, for example, can switch among pages using an operation member. That is, the present invention is also applicable to a personal computer, a PDA, a mobile telephone terminal, a mobile image viewer, a printer apparatus provided with a display, a digital photo frame, a music player, a game console, an electronic book reader, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-119070, filed May 24, 2012, which is hereby incorporated by reference herein in its entirety.

The invention claimed is:

1. A display control apparatus comprising:
a processor; and
a memory storing instructions executable by the processor, wherein the instructions, when executed by the processor, cause the processor to function as:
a display control unit configured to control a display to display a plurality of items;
a changing unit configured to change the plurality of items displayed on the display to a plurality of other items without changing a selected item included among the plurality of items; and
a control unit configured to perform control to change,
(i) in a case where a plurality of items including a first item that has been currently selected, are displayed, in response to an operation being performed on a first operation unit for changing a selected item from the currently selected item to an adjacent item, the selected item from the first item to a second item that is included among the plurality of items being displayed and is adjacent to the first item, and
(ii) in a case where a plurality of items that do not include the first item, are displayed, in response to the operation on the first operation unit, the selected item from the first item to a third item that is not adjacent to the first item and is included among the plurality of items being displayed, successively, in response to the same operation on the first operation unit, the selected item from the third item to a fourth item that is adjacent to the third item and is included among the plurality of items being displayed,
wherein the operation on the first operation unit is an operation for instructing a moving direction, among a plurality of moving directions, of the selected item to an adjacent item located in the moving direction.

2. The apparatus according to claim 1, wherein the processor further functions as
a setting unit configured to update, when the selected item has been changed by the control unit, settings of the apparatus in accordance with an item selected as a result of the change.

3. The apparatus according to claim 1, wherein
the display control unit performs control to display
regardless of whether the plurality of items displayed include the first item, information related to the first item on the display as information related to the selected item, and
when the third item has been selected, information related to the third item on the display as the information related to the selected item.

4. The apparatus according to claim 1, wherein
the third item is included among the plurality of items being displayed that do not include the first item, and is arranged most upstream of all the plurality of items being displayed in a direction from a position where the first item is displayed to a position where the second item is displayed.

5. The apparatus according to claim 1, wherein
the control unit changes
when a second operation for changing the selected item is performed in a case where a plurality of items including the first item are displayed, the selected item from the first item to a fifth item that is included among the plurality of items being displayed and is adjacent to the first item in a direction opposite to a direction in which the second item is adjacent to the first item, and
when the second operation is performed in a case where a plurality of items that do not include the first item are displayed, the selected item from the first item to a sixth item that is not adjacent to the first item and is included among the plurality of items being displayed.

6. The apparatus according to claim 5, wherein
the sixth item is included among the plurality of items being displayed that do not include the first item, and is arranged most upstream of all the plurality of items being displayed in a direction from a position where the first item is displayed to a position where the fifth item is displayed.

7. The apparatus according to claim 1, wherein the changing unit performs control to change a plurality of items displayed on the display to a plurality of other items in accordance with a third operation different from the operation.

8. The apparatus according to claim 1, further comprising an image capturing unit configured to capture an optical image of an object,
wherein the plurality of items include items that enable settings related to shooting.

9. The apparatus according to claim 8, wherein the plurality of items include an item for setting a shooting mode to manual exposure, an item for setting the shooting mode to aperture priority AE, and an item for setting the shooting mode to program AE.

10. The apparatus according to claim 1, further comprising
a touch detection unit configured to detect a touch on the display,
wherein when one of a plurality of items displayed is touched in a case where the plurality of items that do not include the first item are displayed, the control unit changes the selected item to the touched item.

11. The apparatus according to claim 1, wherein the control unit performs control, in response to a first operation for changing the selected item from a currently selected item to an adjacent item in a first direction is performed,
in a case where the first item has been currently selected and is displayed at a portion which is not an end portion in the first direction among a plurality of items being displayed, to change the selected item from the first item to the second item that is included in the plurality of items being displayed and is adjacent to the first item in the first direction and
in a case where a seventh item has been currently selected and is displayed at an end portion in the first direction among a plurality of items being displayed, to display a plurality of other items and to change the selected item from the seventh item to an item displayed at an end portion in a second direction opposite to the first direction among the plurality of other items.

12. The apparatus according to claim 11, wherein the control unit performs control to change the selected item from a currently selected item to an adjacent item in the second direction in response to a second operation for changing the selected item from the currently selected item to the adjacent item in the second direction being performed.

13. The apparatus according to claim 1, wherein a position on which the second item is displayed after the control unit changes the selected item to the second item is different from a position on which the first item is displayed before the control unit changes the selected item to the second item.

14. The apparatus according to claim 12, wherein the control unit performs control, in response to the second operation being performed,
in a case where an eighth item has been currently selected and is displayed at a portion which is not an end portion in the second direction among a plurality of items being displayed, to change the selected item from the eighth item to an item that is included in the plurality of items being displayed and is adjacent to the eighth item in the second direction and
in a case where a ninth item has been currently selected and is displayed at an end portion in the second direction among a plurality of items being displayed, to display a plurality of other items and to change the selected item from the ninth item to an item displayed at an end portion in the first direction among the plurality of other items.

15. The apparatus according to claim 1, wherein the first item is not an item displayed at an end portion among the plurality of items being displayed.

16. A display control method of an apparatus which controls a display to display a plurality of items, the method comprising:
selecting a first item included among a plurality of items;
changing the plurality of items displayed on the display to a plurality of other items that do not include the first item without changing the selection of the first item;
detecting an operation on a first operation unit;
changing the selected item from the first item to a third item that is not adjacent to the first item and is included among the plurality of other items being displayed;
successively detecting the same operation on the first operation unit;
changing the selected item from the third item to a fourth item that is adjacent to the third item and is included among the plurality of other items being displayed,
wherein the operation on the first operation unit is an operation for instructing a moving direction, among a plurality of moving directions, of the selected item to an adjacent item located in the moving direction.

17. A non-transitory computer-readable storage medium storing a program for causing a computer to function as a display control unit, a changing unit and a control unit of a display control apparatus, wherein
the display control unit is configured to control a display to display a plurality of items;
the changing unit is configured to change the plurality of items displayed on the display to a plurality of other items without changing a selected item included among the plurality of items; and
the control unit is configured to perform control to change,
(i) in a case where a plurality of items including a first item that has been currently selected, are displayed, in response to an operation being performed on a first operation unit for changing a selected item from the currently selected item to an adjacent item, the selected item from the first item to a second item that is included among the plurality of items being displayed and is adjacent to the first item, and
(ii) in a case where a plurality of items that do not include the first item, are displayed, in response to the operation on the first operation unit, the selected item from the first item to a third item that is not adjacent to the first item and is included among the plurality of items being displayed, successively, in response to the same operation on the first operation unit, the selected item from the third item to a fourth item that is adjacent to the third item and is included among the plurality of items being displayed,
wherein the operation on the first operation unit is an operation for instructing a moving direction, among a plurality of moving directions, of the selected item to an adjacent item located in the moving direction.

\* \* \* \* \*